United States Patent
Gupta (10) Patent No.: US 10,104,239 B2
(45) Date of Patent: *Oct. 16, 2018

(54) METRICS FOR TRAFFIC STEERING IN A WIRELESS NETWORK

(71) Applicant: Intel IP Corporation, Santa Clara, CA (US)

(72) Inventor: Vivek Gupta, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,383

(22) Filed: Sep. 21, 2016

(65) Prior Publication Data

US 2017/0013496 A1  Jan. 12, 2017

Related U.S. Application Data

(63) Continuation of application No. 14/339,710, filed on Jul. 24, 2014, now Pat. No. 9,479,915.

(Continued)

(51) Int. Cl.
*H04M 1/00* (2006.01)
*H04W 4/00* (2018.01)
(Continued)

(52) U.S. Cl.
CPC .......... *H04M 11/04* (2013.01); *G08B 25/016* (2013.01); *H04B 7/00* (2013.01); *H04L 1/1678* (2013.01); *H04L 5/14* (2013.01); *H04L 47/2466* (2013.01); *H04L 47/2475* (2013.01); *H04L 47/28* (2013.01); *H04L 65/1006* (2013.01); *H04L 65/1016* (2013.01); *H04L 65/1069* (2013.01); *H04W 4/022* (2013.01); *H04W 4/027* (2013.01); *H04W 4/90* (2018.02); *H04W 8/08* (2013.01); *H04W 28/0226* (2013.01); *H04W 28/0247* (2013.01); *H04W 28/0268* (2013.01); *H04W 28/08* (2013.01); *H04W 36/00* (2013.01);
(Continued)

(58) Field of Classification Search
CPC .......... H04W 4/00–4/008; H04W 8/00–8/245; H04N 21/631; H04N 21/64707
See application file for complete search history.

(56) References Cited

U.S. PATENT DOCUMENTS

2010/0099393 A1  4/2010  Brisebois et al.
2010/0296415 A1*  11/2010  Sachs ............ H04W 48/18
370/254

(Continued)

OTHER PUBLICATIONS

International Search Report and Written Opinion of corresponding PCT application (PCT/US2014/056115) to parent U.S. Appl. No. (14/339,710) dated Dec. 18, 2014; 13 pages.

*Primary Examiner* — San Htun
(74) *Attorney, Agent, or Firm* — Eschweiler & Potashnik, LLC (57) ABSTRACT

Metrics may be used by user equipment (UE) to steer traffic through different access networks or to provide access network mobility decisions. For example, in one implementation, a UE may determine metrics relating to network conditions associated with at least a non-cellular access network. The metrics may include receive a first value relating to channel utilization of a link between the UE and a WLAN; and a second value relating to a data rate of a link between the WLAN and a WAN.

20 Claims, 5 Drawing Sheets

Related U.S. Application Data (60) Provisional application No. 61/893,792, filed on Oct. 21, 2013.

(51) Int. Cl.

| | |
|---|---|
| H04W 72/00 | (2009.01) |
| H04M 11/04 | (2006.01) |
| H04L 29/06 | (2006.01) |
| H04L 1/16 | (2006.01) |
| H04L 5/14 | (2006.01) |
| H04W 72/04 | (2009.01) |
| H04W 92/02 | (2009.01) |
| H04W 28/02 | (2009.01) |
| H04W 88/06 | (2009.01) |
| H04W 8/08 | (2009.01) |
| H04W 36/00 | (2009.01) |
| H04W 64/00 | (2009.01) |
| H04W 76/00 | (2018.01) |
| H04L 12/855 | (2013.01) |
| H04L 12/859 | (2013.01) |
| H04L 12/841 | (2013.01) |
| H04W 4/02 | (2018.01) |
| H04W 72/08 | (2009.01) |
| H04W 4/021 | (2018.01) |
| H04W 28/08 | (2009.01) |
| G08B 25/01 | (2006.01) |
| H04B 7/00 | (2006.01) |
| H04W 76/50 | (2018.01) |
| H04W 4/90 | (2018.01) |
| H04W 84/04 | (2009.01) |
| H04W 84/12 | (2009.01) |
| H04W 88/08 | (2009.01) |

(52) U.S. Cl.
CPC ..... *H04W 36/0061* (2013.01); *H04W 64/006* (2013.01); *H04W 72/0413* (2013.01); *H04W 72/0446* (2013.01); *H04W 72/085* (2013.01); *H04W 76/00* (2013.01); *H04W 76/50* (2018.02); *H04W 88/06* (2013.01); *H04W 92/02* (2013.01); H04L 1/1607 (2013.01); H04M 2242/04 (2013.01); H04W 84/042 (2013.01); H04W 84/12 (2013.01); H04W 88/08 (2013.01); Y02D 70/12 (2018.01); Y02D 70/126 (2018.01)

(56) References Cited

U.S. PATENT DOCUMENTS

| | | | |
|---|---|---|---|
| 2011/0090794 A1* | 4/2011 | Cherian | H04L 45/38 370/235 |
| 2012/0023189 A1* | 1/2012 | Giaretta | H04W 48/18 709/217 |
| 2012/0311173 A1* | 12/2012 | Agarwal | H04L 43/0829 709/231 |
| 2013/0012260 A1 | 1/2013 | Salkintzis et al. | |
| 2013/0083661 A1 | 4/2013 | Gupta et al. | |
| 2013/0083678 A1 | 4/2013 | Yin | |
| 2013/0242783 A1 | 9/2013 | Horn et al. | |
| 2013/0242965 A1 | 9/2013 | Horn et al. | |
| 2014/0153546 A1* | 6/2014 | Kim | H04W 48/18 370/332 |
| 2014/0204904 A1 | 7/2014 | Xiang et al. | |

* cited by examiner

| Traffic Steering Metric | Value |
|---|---|
| throughput | 2 Mbps |
| network coverage level | 70% |
| mobility of UE | stationary |

METRICS FOR TRAFFIC STEERING IN A WIRELESS NETWORK

RELATED APPLICATIONS

The present application is a continuation of U.S. patent application Ser. No. 14/339,710, which was filed on Jul. 24, 2014, and which claims the benefit of U.S. Provisional Patent Application No. 61/893,792, which was filed on Oct. 21, 2013, and which are both hereby incorporated by reference as though fully set forth herein.

BACKGROUND

Wireless mobile communication devices, such as smart phone or other mobile devices, may access Internet Protocol (IP) networks using different types of access networks. For example, a mobile device may connect to an IP-based core network using access technologies according to standards such as 3GPP (3rd Generation Partnership Project), 3GPP2 (3rd Generation Partnership Project 2), and WLAN (wireless local area network, such as a Wi-Fi-based WLAN).

The term "mobility management" refers to the ability of a mobile device to keep the same IP address, stay connected, and maintain ongoing applications while roaming between IP networks. Mobility management may be used, for example, in order to enable traffic offloading from a cellular access network (e.g., a 3GPP or 3GPP2 access network) to a WLAN access network. Mobility management can refer to both initial selection of an access network and traffic steering between access networks. "Traffic steering" may refer to dynamically varying the access network that is used for a particular application or packet flow.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein relate to metrics that may be used, by mobile devices (called user equipment (UE) herein) or network elements, to steer traffic through different access networks. Traffic steering policies, based on one or more of these metrics, may be statically configured in the UE or dynamically pushed to the UE. With the techniques described herein, the UE may efficiently direct network traffic, between different access networks, to enhance the user experience and/or to more effectively use available network resources.

One implementation described herein may include a UE comprising processing circuitry to connect to a cellular access network; connect to a non-cellular access network; and determine traffic steering metrics relating to network conditions associated with the non-cellular access network. The traffic steering metrics may include a first traffic steering metric calculated based on a received signal strength of the non-cellular access network relative to a reference signal strength associated with the non-cellular access network, and a second traffic steering metric relating to a mobility of the UE with respect to network coverage of the non-cellular access network. The processing circuitry may be further to determine whether to route traffic to the non-cellular access network based on the first traffic steering metric and the second traffic steering metric; and route traffic to the non-cellular access network based on a result of the determination of whether to route traffic to the non-cellular access network.

The processing circuitry may be further to route the traffic to the non-cellular access network when the first traffic steering metric is above a first threshold for a second threshold period of time, and the second traffic steering metric indicates that the mobility of the UE, with respect to the network coverage of the non-cellular access network, is likely to result in the UE continuing to be in the network coverage of the non-cellular access network for at least a third threshold period of time.

The processing circuitry may be further to: calculate the second traffic steering metric, relating to mobility, as a value indicating an estimated time with which the UE is likely to remain in the network coverage of the non-cellular access network. The cellular access network may include a 3rd Generation Partnership Project (3GPP) access network, wherein the non-cellular access network includes a Wi-Fi access network, and wherein the processing circuitry is further to: receive inter-system routing policies (ISRPs) from an Access Network Discovery and Selection Function (ANDSF) associated with the 3GPP access network; and perform the routing of traffic to the non-cellular access network based on rules in the ISRPs.

The traffic steering metrics may further include: metrics relating to throughput of the non-cellular access network, wherein routing the traffic is additionally based on the metrics relating to throughput.

The metrics relating to throughput of the non-cellular access network may further include: one or more values relating to station population or traffic levels of a Basic Service Set (BSS) of an access point of the non-cellular access network; or one or more values relating to load of a wide area network (WAN) link connecting the non-cellular access network to an external network.

The processing circuitry may be further to: receive inter-system mobility policies (ISMPs) from an ANDSF; and perform connection and detachment, with the non-cellular access network, based on the first and second traffic steering metrics applied to the ISMPs.

In another possible implementation, a UE may include first logic to connect with a first access network; second logic to connect with a second access network; and processing circuitry to: receive inter-system mobility policies (ISMPs), from a network device and via the first or second access networks; determine metrics relating to network conditions associated with the second access network, the metrics including two or more of: metrics relating to throughput associated with the second access network, metrics relating to network coverage associated with the second access network, and metrics relating to mobility of the UE with respect to the second access network; and control the second logic, to connect to the second access network, based on the ISMPs and the determined metrics.

The metrics relating to throughput may include at least one value relating to uplink or downlink data rates experienced by the UE with respect to the second access network. The metrics relating to throughput may additionally include: one or more values relating to station population or traffic levels of a BSS of an access point of a WLAN associated with the second access network; or one or more values relating to load of a WAN link connecting the WLAN to an external network.

The metrics relating to throughput may additionally include one or more values based on: a Received Channel Power Indicator (RCPI); a Received Signal to Noise Indicator (RSNI); a BSS average access delay; or a BSS Access Category (AC) Access Delay.

The metrics relating to network coverage may include a percentage signal strength determined based on a received signal strength of the second access network relative to a reference signal strength associated with the second access network. The reference signal strength may include a maximum signal strength of the second access network.

The reference signal strength and the determined signal strength may be determined based on Received Signal Strength Indicator (RSSI) values associated with the second access network.

The metrics relating to mobility of the UE may include a value indicating relative mobility of the UE with respect to network coverage of the second access network. The metrics relating to mobility of the UE may include a value that represents: a remaining time within the second access network; or a speed of the UE.

In another implementation, a method may include receiving, by a mobile device, ISRPs relating to inter-system routing between a plurality of access networks; determining, by the mobile device, metrics relating to network conditions associated with at least one of the plurality of access networks, the metrics including two or more of: metrics relating to throughput associated with the at least one of the plurality of access networks, metrics relating to network coverage associated with the at least one of the plurality of access networks, and metrics relating to mobility of the mobile device with respect to the at least one of the plurality of access networks; and making, by the mobile device, traffic routing decisions relating to whether to route traffic to the at least one of the plurality of access networks, based on the received ISRPs and the determined metrics.

The method may further include receiving ISMPs relating to inter-system mobility between the plurality of access networks; and determining whether to attach to the at least one of the plurality of access networks based on the received ISMPs and the determined metrics. The ISRPs and the ISMPs may be received from an ANDSF device.

Additionally, the plurality of access networks may include a 3GPP access network and a non-3GPP access network, and wherein the ISRPs and the ISMPs are received from the ANDSF via the 3GPP access network.

In yet another implementation, a mobile device may include logic to connect to a plurality of access networks; a non-transitory memory device storing a plurality of processor-executable instructions; and a processor configured to execute the processor-executable instructions, wherein executing the processor-executable instructions causes the processor to: determine metrics relating to network conditions associated with the plurality of access network. The metrics may include a first metric relating to throughput associated with the plurality of access networks, a second metric relating to network coverage associated with the plurality of access networks, and a third metric relating to mobility of the mobile device with respect to the plurality of access networks. The processor-executable instructions may further cause the processor to steer network traffic over the plurality of access networks based on the first, second, and third metrics.

In yet another implementation, a mobile device may include means for receiving ISRPs relating to inter-system routing between a plurality of access networks; means for determining metrics relating to network conditions associated with at least one of the plurality of access networks, the metrics including two or more of: metrics relating to throughput associated with the at least one of the plurality of access networks, metrics relating to network coverage associated with the at least one of the plurality of access networks, and metrics relating to mobility of the mobile device with respect to the at least one of the plurality of access networks. The mobile device may further include means for making traffic routing decisions relating to whether to route traffic to the at least one of the plurality of access networks, based on the received ISRPs and the determined metrics.

Figure 1:
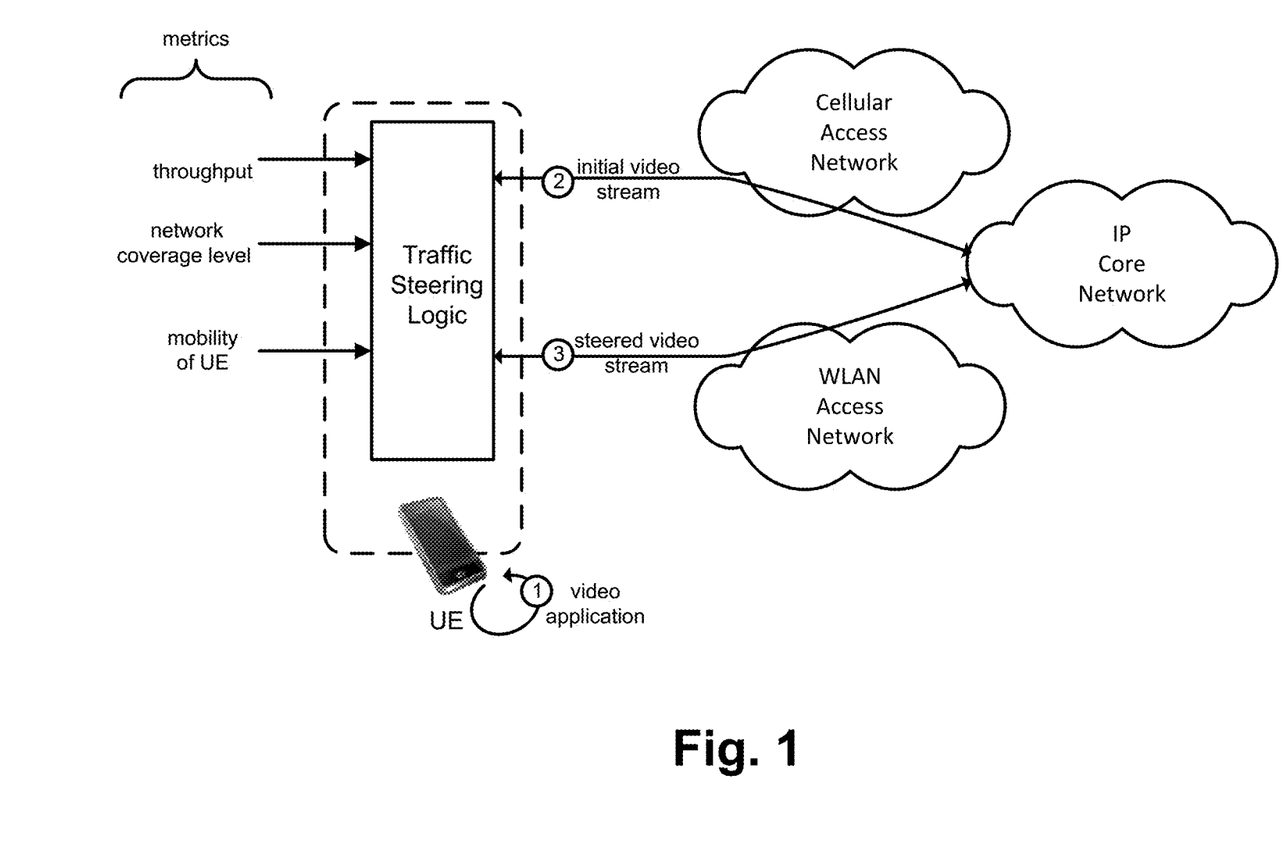
FIG. 1 is a diagram illustrating an example overview of aspects described herein.

FIG. 1 is a diagram illustrating an example overview of aspects described herein. As illustrated in FIG. 1, a UE may include traffic steering logic that may be used to select among different available access networks when communicating with an IP core network. In this example, the access networks are illustrated as a cellular access network (e.g., a 3GPP or 3GPP2 access network) and a WLAN access network (e.g., a Wi-Fi based access network). The traffic steering logic, of the UE, may operate in conjunction with network elements (e.g., network devices in the WLAN access network, cellular access network, and/or the IP core network) to implement mobility management protocols, such as Proxy Mobile (PMIP), General Packet Radio Service (GPRS) Tunneling Protocol (GTP), or Mobile IP (MIP), that allows UE to maintain the same IP address, and potentially maintain ongoing applications, while performing traffic steering between one or both of the cellular access network and the WLAN access network.

The traffic steering logic may use a number of traffic steering metrics when making decisions relating to traffic steering. The traffic steering metrics may generally relate to network conditions associated with the cellular access network and/or the non-cellular access network. As illustrated, the metrics may include: (1) metrics relating to throughput level, (2) metrics relating to network coverage level, (3) metrics relating to the mobility of the UE, and/or other metrics. In some implementations, the UE may measure or calculate the metrics. Alternatively, or additionally, the UE may receive the metrics from network devices. The traffic steering decisions may be based on the one or more metrics, either individually or in combination.

As illustrated in FIG. 1, assume that an application, such as a video streaming application, is executing at the UE to download a streaming video from the IP core network (arrow 1, "video application"). A packet flow corresponding to the streaming video may be initially received through the cellular access network (arrow 2, "initial video stream"). Based on the one or more metrics, the traffic steering logic of the UE may determine to switch the packet-flow corresponding to the streaming video to the WLAN access network (e.g., a Wi-Fi access point). As an example, assume that the traffic steering logic determines that the UE's mobility is low (e.g., that the UE is relatively stationary with respect to the coverage provided by the WLAN access network), and that the minimum throughput available from the WLAN access network is greater than the required throughput of the streaming video. In this situation, the packet flow may be switched (steered) from the cellular access network to the WLAN access network (arrow 3, "steered video stream"). From the perspective of the video streaming application, the video stream may continue uninterrupted.

Figure 2:
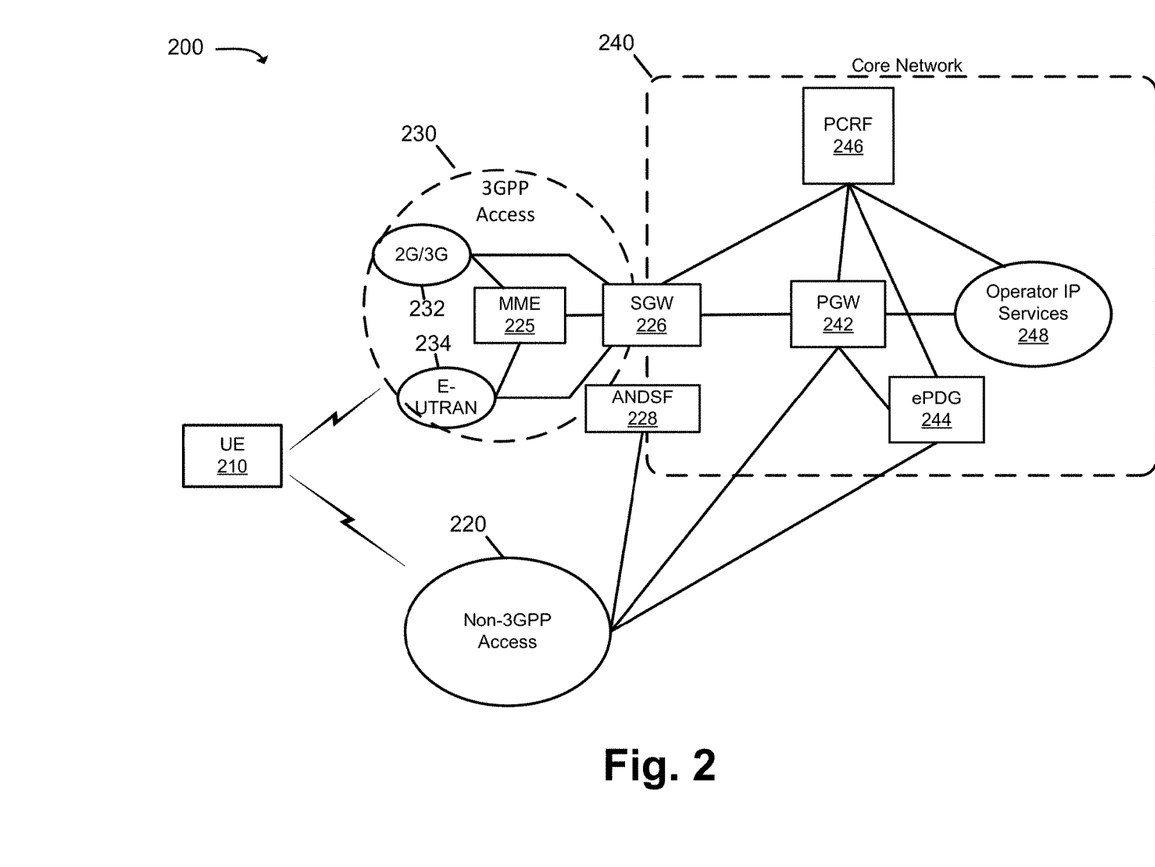
FIG. 2 is a diagram of an example environment in which systems and/or methods described herein may be implemented.

FIG. 2 is a diagram of an example environment 200 in which systems and/or methods described herein may be implemented. As illustrated, environment 200 may include UE 210, which may obtain network connectivity through a number of different possible access networks. The access networks may include non-3GPP access network 220 (i.e., a non-cellular access network) and 3GPP access network (i.e., a cellular access network) 230. 3GPP access network 230 may be associated with a network operator that controls or otherwise manages core network 240. Core network 240 may include an IP-based network, such as System Architecture Evolution (SAE) core network or a GPRS core network.

UE 210 may include portable computing and communication devices, such as a personal digital assistant (PDA), a smart phone, a cellular phone, a laptop computer with connectivity to a cellular wireless network, a tablet computer, etc. UE 210 may also include non-portable computing devices, such as desktop computers, consumer or business appliances, or other devices that have the ability to connect to wirelessly connect to non-3GPP access network 220 and/or 3GPP access network 230.

Non-3GPP access network 220 may include one or more network devices that provide wireless network connectivity to UE 210, such as wireless connectivity via unlicensed spectrum. Non-3GPP access network 220 may include, for example, a Wi-Fi access network, a Worldwide Interoperability for Microwave Access (WiMAX) access network, LTE-Unlicensed (LTE-U), or another type of access network. Non-3GPP access network 220 may be operated by the same entity (e.g., the same telecommunications provider) that operates 3GPP access network 230 and core network 240, or by a different entity. Techniques discussed herein may particularly refer to access network 220 as a Wi-Fi based WLAN. It can be appreciated that the techniques can also be applied to other technologies.

3GPP access network 230 may represent a cellular access network that includes one or more access technologies. Two example access technologies are particularly illustrated in FIG. 2: 2G/3G 232 and Evolved Terrestrial Radio Access Network (E-UTRAN) 234. 2G/3G 232 may represent one or more base stations (also called eNodeBs) or other elements that provide a wireless interface based on the second-generation wireless telephone technology standard or the 3GPP Long Term Evolution (LTE) standard. 2G/3G 232 may be implemented based on Universal Mobile Telecommunications System (UMTS), High-Speed Downlink Packet Access (HSDPA), or High-Speed Uplink Packet Access (HSUPA) technologies. E-UTRAN 234 may represent one or more eNodeBs or other elements that provide a wireless interface using the evolved UMTS Terrestrial Radio Access (E-UTRA) standard.

3GPP access network 230 may additionally include mobility management entity (MME) 225, serving gateway (SGW) 226, and Access Network Discovery and Selection Function (ANDSF) 228. SGW 226 and ANDSF 228 may be conceptually considered as being part of 3GPP access network 230 and/or part of core network 240. ANDSF 228 may alternatively be implemented as a network element that is external to 3GPP access network 230 and core network 240.

MME 225 may include one or more computation and communication devices that perform operations to register UE 210 with core network 240, establish bearer channels associated with a session with UE 210, hand off UE 210 from one eNodeB to another, and/or perform other operations. MME 225 may generally handle control plane traffic. SGW 226 may include one or more network devices that aggregate traffic received from one or more eNodeBs (e.g., from eNodeBs associated with 2G/3G 232 and/or E-UTRAN 234) and send the aggregated traffic to PGW 242. SGW 226 may generally handle user (data) plane traffic.

ANDSF 228 may include one or more computation and communication devices to provide data management and control functionality necessary to provide network discovery and selection assistance in accordance with policy set by the network operation (e.g., the operator of the 3GPP network). ANDSF 228 may respond to UE requests for access network discovery information ("pull mode" operation) and may be able to initiate data transfer to UE 210 ("push mode" operation) based on network triggers or as a result of previous communication with UE 210. ANDSF 228 may, for example, be configured with inter-system mobility policies (ISMPs) and inter-system routing policies (ISRPs) that include rules and/or preferences that define the inter-system mobility and inter-system routing decisions taken by UE 210. UE 210 may use the ISMPs/ISRPs when determining when inter-system mobility is allowed or restricted and to select the most preferable access technology type or access network that should be used to access EPC.

The ISMPs may include a set of operator defined rules that affect inter-system mobility decisions taken by UE 210. UE 210 may use the ISMPs to in order to select the most preferable access technology type or access network that should be used to connect to core network 240. Similarly, UE 210 may use an ISRP to in order to route or steer traffic over connected access networks. The ISMPs/ISRPs may be provisioned in UE 210 and may be updated by ANDSF 228 based on network triggers or after receiving request for network discovery. An ISMP/ISRP rule may include validity conditions that indicate when the rule is valid. The validity conditions may include parameters relating to time duration for which the rule is valid, location or area in which the rule is valid, and one or more traffic steering metrics describing when the rule is valid. The metrics may include the metrics described with respect to FIG. 1: 1) metrics relating to throughput, (2) metrics relating to network coverage, (3) metrics relating to the mobility of the UE, and/or other metrics. These metrics, when implemented in ISMPs/ISPRs, may be used to control traffic steering by UE 210.

Core network 240 may include an IP-based network. In the 3GPP network architecture, core network 240 may include an Evolved Packet Core (EPC). As illustrated, core network 240 may include packet data network gateway (PGW) 242, evolved packet data gateway (ePDG) 244, policy charging and rules function (PCRF) 246, and operator IP services 248.

PGW 242 may include one or more devices that act as the point of interconnect between the core network 240 and external IP networks and/or operator IP services 248. PGW 242 may route packets to and from the access networks and the external IP networks. ePDG 244 may include one or more devices responsible for interworking between core network 240 and untrusted non-3GPP networks (e.g., non-3GPP access network 220) that require secure access. ePDG 244 may act as a termination node of IPsec tunnels established with UE 210. PCRF 246 may operate in real-time to determine policy rules for the network. PCRF 246 may aggregate information to and from core network 240, operational support systems, and other sources. PCRF 246 may support the creation of rules and policy decisions for active subscribers.

Operator IP services 248 may represent one or more services that are offered by the operator of core network 240. The services may include IP multimedia (IMS)-based services, transparent end-to-end packet-switched streaming services (PSSs), or other services.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

Figure 3:
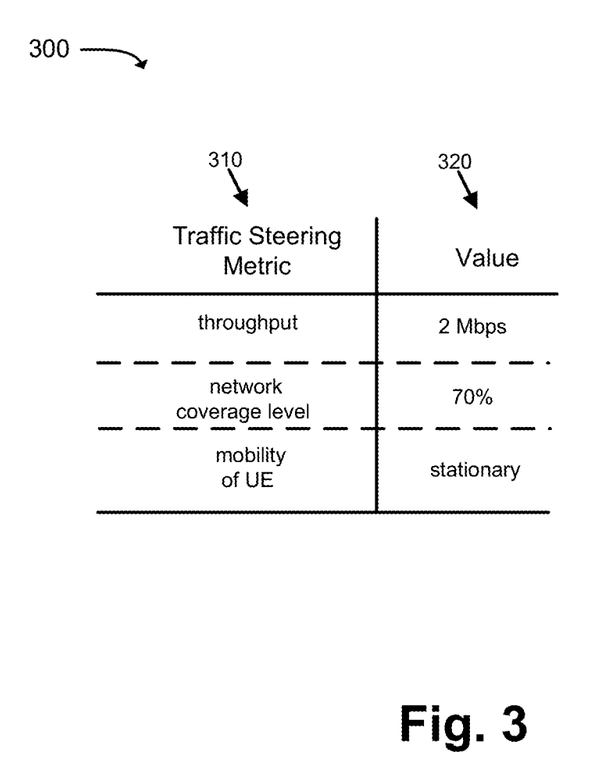
FIG. 3 illustrates an example data structure that may be stored by user equipment.

FIG. 3 illustrates an example data structure 300 that may be stored a UE 210. Data structure 300 may store values corresponding to the traffic steering metrics. The values may be calculated by UE 210, obtained from the network (e.g., non-3GPP access network 220, 3GPP access network 230, and/or core network 240), or both. In some implementations, a subset of the traffic steering metrics, illustrated in data structure 300, may be implemented. Thus, data structure 300 may include fewer, additional, or different fields or records than those illustrated.

In some implementations, in addition to performing traffic steering between 3GPP access network 230 and non-3GPP access network 220, based on the metrics illustrated in data structure 300, the metrics may be used to select access networks for attachment.

As illustrated, data structure 300 may include traffic steering metric field 310 and value field 320. Traffic steering metric 310 may indicate the particular traffic steering metric that is used by UE 210 in making traffic steering decisions. Value field 332 may represent the corresponding value of the traffic steering metric. Data structure 300 may be maintained on a per-access network basis.

As illustrated in the first record of data structure 300, UE 210 may maintain traffic steering metrics relating to throughput. Throughput metrics may relate to uplink/downlink data rates experienced by UE 210 with respect to the access networks (e.g., non-3GPP access network 220). For example, as illustrated, the throughput metric may have a value of 2 Mbps (two megabits per second). The throughput metrics may include uplink and/or downlink values and can be expressed as channel utilization values (e.g., as a percentage).

The throughput traffic steering metric may be particularly applicable to Wi-Fi-based access networks. Wi-Fi networks allow for the following two load thresholds to be obtained by connected UEs: Basic Service Set (BSS) Load metrics and wide area network (WAN) metrics. In Wi-Fi-based WLAN networks, components that can connect into the wireless medium in the WLAN network may be referred to as stations. The basic service set (BSS) may be defined as the set of all stations that can communicate with each other.

The BSS Load metric may include information relating to the current station population (where a station is a component that can connect into a wireless medium in the Wi-Fi network) and traffic levels in the BSS. The BSS Load information may be sent in WLAN beacons (i.e., network signals that are available to all listening stations, even if not connected to the access-point that is broadcasting the beacon). As a result, UE 210 can obtain the BSS Load information prior to Wi-Fi access point selection (pre-association). The BSS Load metric may be expressed as a percentage where, for example, a BSS Load of 100% indicates a fully loaded access network.

The WAN metric may provide information about the WAN link connecting a Wi-Fi access network to an external network (e.g., the Internet). In one implementation, UE 210 may obtain the WAN metrics via an extension of the information obtainable via the Access Network Query Protocol (ANQP). The ANQP protocol may be a query and response protocol that defines services offered by an access point (e.g., at a Wi-Fi hot spot). A conventional ANQP query may be used to obtain metadata such as: the domain name of the operator of the access point, the IP addresses available at the access point, and information about potential roaming partners accessible through the access point. Consistent with aspects described herein, ANQP queries may also provide information relating to the link connecting the access point to an external IP network (e.g., the Internet). For example, a query for WAN metrics, to an access point, may result in the access point returning an indication of the load (e.g., channel utilization) of the link to the external IP network, an amount of available bandwidth of the link, average latency relating to the link, or other values relating to the throughput of the link to the external IP network. The WAN metric may be expressed as a percentage where, for example, a WAN metric of 100% may indicate a fully loaded WAN link. Alternatively or additionally, the channel utilization relating to the WAN link connecting the Wi-Fi access network to an external network may be obtained from Radio Access Network (RAN) assistance information obtained from 3GPP access network 230.

Using BSS Load metrics and WAN metrics when performing traffic steering can have a number of potential advantages. For example, network operators may want to ensure that the user experience level remains above a desired minimum level. Hence, it may be important that network quality criteria based on BSS Load and WAN metrics thresholds are satisfied. The thresholds may be included in ISMP and ISRP specific policies. Different thresholds may potentially be used for the ISMP and ISRP policies. For example, an ISMP rule may indicate that a first threshold load value (e.g., less than 60%) should be satisfied before UE 210 selects a particular access network but that, once selected, a second threshold value (e.g., less than 70%) should be satisfied before UE 210 steers traffic to the particular access network.

In some implementations, traffic steering metrics relating to throughput may be calculated based on values other than BLL Load and WAN metrics. For example, throughput may be determined based on Received Channel Power Indicator (RCPI) or the Received Signal to Noise Indicator (RSNI). RCPI may include a measure of the received RF power in a selected channel over an entire Wi-Fi frame. RCPI and RSNI values may each be obtainable from a station channel scan or from measurements associated with Wi-Fi beacon signals. As another example, throughput may be determined based on BSS average access delay. BSS average access delay may be the average medium access delay for a transmitted frame, measured from the time the frame is ready for transmission until the actual frame transmission start time. The BSS average access delay may be used as a proxy for network load (e.g., relatively high BSS average access delay values may indicate a highly loaded network). Similarly, the BSS Access Category (AC) Access Delay (for quality of service enabled access points) may represent the average medium access delay for Institute of Electrical and Electronics Engineers (IEEE) 802.11e access categories. The BSS average access delay may also be used as a proxy for network load. As yet another example, the transmit/receive frame drop count for an access point may describe the number of frames dropped over a time period. Congested or loaded networks tend to incur frame drops, thus the frame drop count may also be used as a proxy for network load.

As illustrated in the second record of data structure 300, UE 210 may also maintain traffic steering metrics relating to network coverage level. Network coverage level may relate to a quantification of how close UE 210 is to an edge area of the coverage of a particular access point (e.g., a Wi-Fi access point) or other radio interface. As an example, a network operator may wish to implement a policy that specifies that UE 210 only use a particular WLAN when UE 210 is well within the coverage of the particular WLAN. As illustrated in value field 320, the network coverage level may be 70%.

In one implementation, the network coverage level, for a particular access network, may be defined as a ratio of the currently received signal strength of the particular access network to a maximum or reference signal strength of the particular access network. Thus, the network coverage level may be equivalent to a "percentage signal strength" value. For example, the percentage signal strength value may be calculated as a ratio of the Received Signal Strength Indicator (RSSI) value to a maximum value. The RSSI value may be measured by UE 210. The maximum value may be specified by the network operator (e.g., as part of the ISMP/ISPR) or may be determined by UE 210 (e.g., such as based on a historical analysis of the RSSI values for a particular access network, may be pre-configured in UE 210, or in some other manner). Using a percentage signal strength value, as a network coverage level metric, may normalize the metric for coverage level when using different access network technologies and/or signal strength measurement techniques.

In some implementations, an access point may also use the signal strength, corresponding to a request from a UE, to judge when it is appropriate to allow or deny the association of the UE. The access point may, for example, use a percentage signal strength metric calculated as a ratio of a measured signal strength of the UE request (e.g., an RSSI value) to the measured signal strengths of other UEs that connect to the access point. For example, the access point may measure the average signal strength of connecting UEs and deny UE connection requests in which the signal strength, corresponding to the connecting UE, is below a threshold percentage strength of the average UE connection request (e.g., a UE that requests a connection may be denied if the signal strength associated with the connection request is less than half of the average signal strength of connecting UEs).

In some implementations, when receiving an access point request in which the percentage signal strength is below a certain configurable threshold, the access point may respond to the UE by denying the request and requesting that the UE retry association with the access point only after a certain delay time period.

In addition to percentage signal strength, other network coverage level metrics, such as timeout values, latency values, or other values, may be used as metrics relating to network coverage level. A combination of minimum coverage level values, such as percentage signal strength levels, timeout values, reaction to changing percentage signal strength levels, and retry values on a configurable basis (per access point, per BSS, etc.) may be used to determine a combined network coverage level metric.

As illustrated in the third record of data structure 300, UE 210 may maintain traffic steering metrics relating to the mobility of the UE. The mobility of UE 210 may be defined as the relative mobility of UE 210 with respect to network coverage of 3GPP access network 230 and/or non-3GPP access network 220. The mobility of UE 210 may be expressed as, for example: a speed of UE, an estimated time value through which UE 210 is likely to remain in the coverage area an access network, or other values. For example, as illustrated, the mobility of UE 210 may be given as "stationary" in FIG. 3, which may indicate UE 210 is not moving.

In one implementation, UE 210 may maintain the value, relating to the mobility of UE 210, based on the speed of UE 210. For example, the mobility of UE 210 may be expressed as the speed of UE 210 or as a discreet categorization based on the speed, such as: stationary, walking (e.g., 1-4 mph), running (e.g., 4-10 mph), cycling (e.g., 10-25 mph), and vehicular speed (e.g., >25 mph). As an example of a traffic steering policy implemented based on mobility of UE 210, traffic may be steered to a WLAN-based access network only when the speed of UE 210 is below a threshold or is in one or more categories (e.g., stationary and walking). In some implementations, the mobility of UE 210 may be expressed as an estimated time for which UE 210 is likely to remain within the coverage of a particular access network. For example, an estimate of the remaining time within a particular access network may be determined based on the speed of UE 210, the direction of UE 210, and the size of the access network. As another example, an estimate of the remaining time within a particular access network may be determined based on historical information relating to how much time UE 210 has previously spent within the access network. As another example, historical information relating to whether a particular access network is a high turnover network (i.e., an access network for which attaching UEs tend to quickly leave the access network) may be used when determining the mobility of UE 210.

Figure 4:
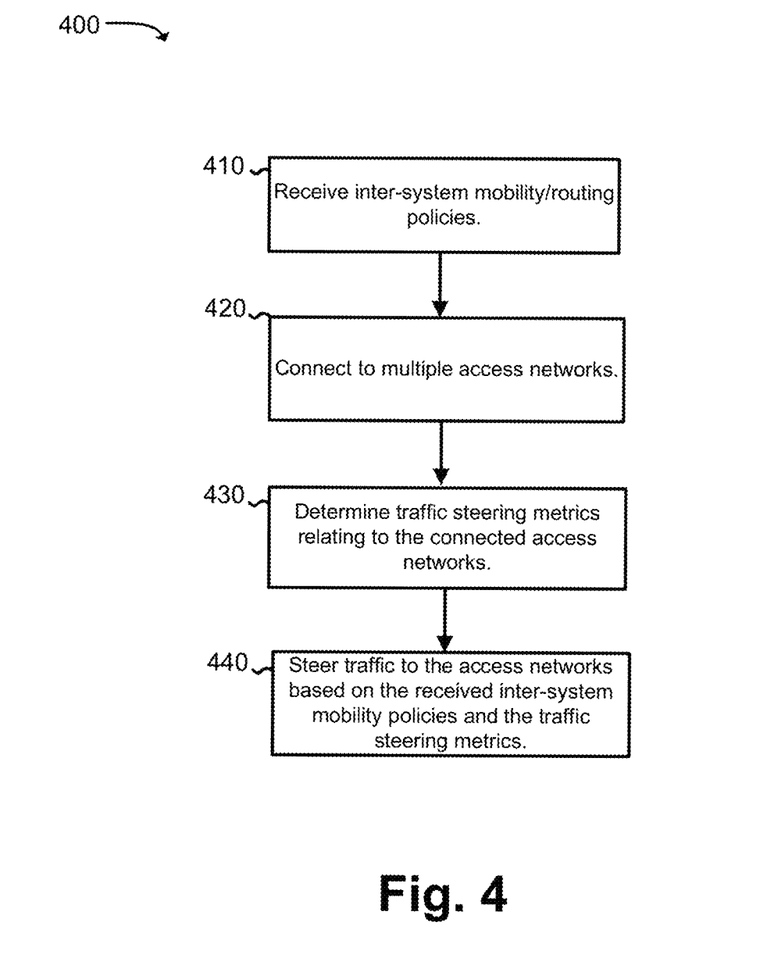
FIG. 4 is a flow chart illustrating an example process for performing traffic steering.

FIG. 4 is a flow chart illustrating an example process 400 for performing traffic steering. Process 400 may be implemented by, for example, UE 210. In some implementations, process 400 may be implemented by both UE 210 and one or more other elements of environment 200, such as ANDSF 228.

Process 400 may include receiving inter-system mobility policies (ISMPs) and/or inter-system routing policies (ISRPs) (block 410). The ISMPs/ISRPs may be received, by UE 210, from ANDSF 228. As previously mentioned, the ISMPs/ISRPs may define rules and preferences that affect the inter-system mobility and inter-system routing decisions taken by UE 210. The inter-system mobility and inter-system routing decisions may be defined based at least on one or more of the traffic steering metrics discussed previously. In some implementations, the ISMPs/ISRPs may be received from a device other than ANDSF 228, such as from an eNodeB or another element in 3GPP access network 230.

Process 400 may further include connecting to multiple access networks (block 420). As mentioned, UE 210 may include multiple radio interfaces, which may give UE 210 the ability to concurrently connect to multiple access networks, such as to both of non-3GPP access network 220 and 3GPP access network 230.

Process 400 may further include determining traffic steering metrics relating to the connected access networks (block 430). For example, UE 210 may monitor one or more of the throughput, network coverage level, or mobility metrics, as previously discussed. Monitoring of the traffic steering metrics, as used herein, may include determining the traffic steering metrics based on criteria determined by UE 210 (e.g., GPS measurements, measured RSSI, etc.) and/or determining the traffic steering metrics based on criteria received by UE 210 from the network (e.g., throughput measurements received from an access point, historical mobility information relating to an access network and received from the access network, information from ANDSF 228, etc.). UE 210 may maintain the traffic steering metrics on a per-access network basis.

Process 400 may further include steering traffic to the access networks based on the received inter-system mobility/routing policies and based on the monitored traffic steering metrics (block 440). The inter-system mobility/routing policies may include one or more network operator generated rules that define how traffic is to be steered between access networks. The traffic steering decisions may be based on the one or more traffic steering metrics, either individually or in combination. The traffic steering may include routing traffic, such as traffic for a particular flow or for a particular application (e.g., a video conferencing application), over one or more access networks. When switching traffic between different access networks, the traffic may be switched to minimize handover latency due to authentication and authorization for network access and to potentially allow the application to continue to operate, from the point-of-view of the endpoints of the application, uninterrupted.

Examples of steering traffic using on the above-discussed traffic steering metrics will next be discussed.

As a first example, assume UE 210 includes a rule to attach to a Wi-Fi access point when the BSS Load of the access point is below 60 percent. In addition, assume UE 210 has received a first ISRP rule for routing Internet traffic over Wi-Fi access points when a BSS Load threshold is less than 60 percent and a second ISRP rule for routing voice traffic over Wi-Fi access points when a BSS Load threshold is less than 40 percent. In this example, the UE may select a Wi-Fi access point meeting the 60 percent threshold (and other conditions). Internet traffic from UE 210 may get routed over the Wi-Fi WLAN, while the voice traffic may or may not get routed over the Wi-Fi WLAN, depending on whether BSS Load is below 40 percent.

As another example, assume UE 210 includes an ISMP rule to attach to a Wi-Fi access point when the BSS Load of the access point is below 60 percent. In addition, UE 210 may contain one or more ISRP rules. It may be possible that none of the ISRP rules include rules based on a BSS Load threshold.

As another example, assume UE 210 includes an ISMP rule to attach to a Wi-Fi access point regardless of the BSS Load of the access point. UE 210 may attach to a Wi-Fi access point regardless of the BSS Load associated with the access point. UE 210 may contain multiple ISRP rules, each of which may have a BSS Load threshold.

As another example, detection of the UE relative mobility to a WLAN (e.g., a Wi-Fi access point) may also be used in conjunction with percentage signal strength when making a decision about traffic steering to the WLAN. When UE 210 is in motion, UE 210 may steer traffic to the WLAN when the percent signal strength from the access point remains above a minimum threshold for a certain time. Steering the traffic may introduce switching a delay in the connection/traffic steering but if the delay is kept within a reasonable duration, the switching delay may not result in poor user experience and overall experience may be improved. As another example, the ISMP and ISRP rules may include validity conditions that indicate when a particular rule is valid. The validity conditions may include parameters that are based on percentage signal strength of UE 210, a time (duration) value for which the percentage signal strength is above a minimum threshold level, and the mobility of UE 210. For instance, an ISMP or ISRP rule may include a validity condition that states that traffic steering or network selection, of a WLAN network, is valid when: the percentage signal strength is above 55% for at least five seconds and the mobility of the UE is "stationary" or "walking." If these conditions are satisfied, UE 210 may select the WLAN and/or steer traffic over the WLAN.

Figure 5:
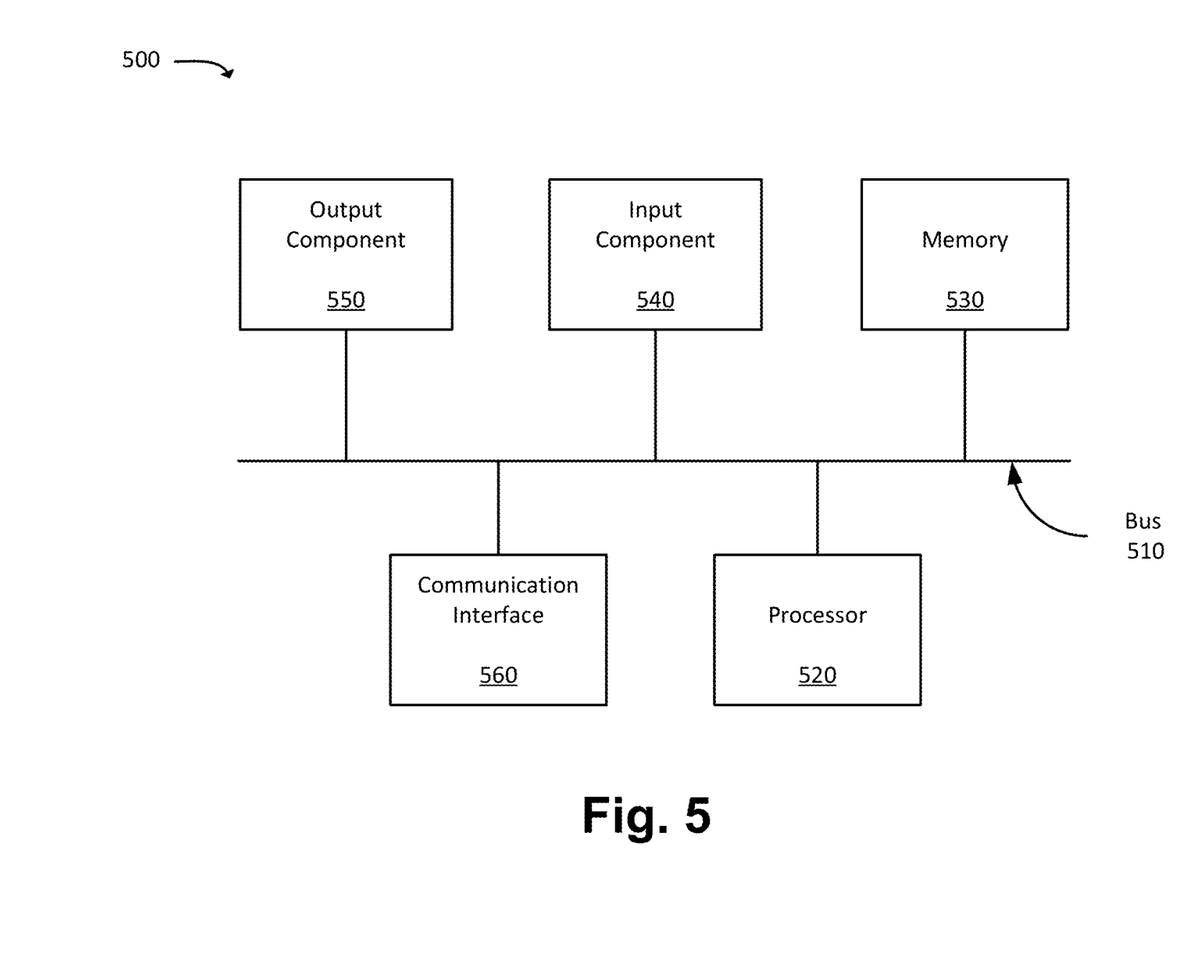
FIG. 5 is a diagram of example components of a device.

FIG. 5 is a diagram of example components of a device 500. Each of the devices illustrated in FIGS. 1 and 2 may include one or more devices 500. Device 500 may include bus 510, processor 520, memory 530, input component 540, output component 550, and communication interface 560. In another implementation, device 500 may include additional, fewer, different, or differently arranged components.

Bus 510 may include one or more communication paths that permit communication among the components of device 500. Processor 520 may include processing circuitry, such as a processor, microprocessor, or processing logic that may interpret and execute instructions. Memory 530 may include any type of dynamic storage device that may store information and instructions for execution by processor 520, and/or any type of non-volatile storage device that may store information for use by processor 520.

Input component 540 may include a mechanism that permits an operator to input information to device 500, such as a keyboard, a keypad, a button, a switch, etc. Output component 550 may include a mechanism that outputs information to the operator, such as a display, a speaker, one or more light emitting diodes (LEDs), etc.

Communication interface 560 may include any transceiver-like mechanism that enables device 500 to communicate with other devices and/or systems. For example, communication interface 560 may include an Ethernet interface, an optical interface, a coaxial interface, or the like. Communication interface 560 may include a wireless communication device, such as an infrared (IR) receiver, a Bluetooth® radio, a WiFi radio, a cellular radio, or the like. The wireless communication device may be coupled to an external device, such as a remote control, a wireless keyboard, a mobile telephone, etc. In some embodiments, device 500 may include more than one communication interface 560. For instance, device 500 may include an optical interface and an Ethernet interface.

Device 500 may perform certain operations described above. Device 500 may perform these operations in response to processor 520 executing software instructions stored in a computer-readable medium, such as memory 530. A computer-readable medium may be defined as a non-transitory memory device. A memory device may include space within a single physical memory device or spread across multiple physical memory devices. The software instructions may be read into memory 530 from another computer-readable medium or from another device. The software instructions stored in memory 530 may cause processor 520 to perform processes described herein. Alternatively, hardwired circuitry may be used in place of or in combination with software instructions to implement processes described herein. Thus, implementations described herein are not limited to any specific combination of hardware circuitry and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIG. 4, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. User Equipment (UE) comprising:
a first transceiver to connect with a cellular access network;
a second transceiver to connect with a wireless local area network (WLAN); and
processing circuitry to:
receive a first threshold value, from a network device and via the cellular access network or the WLAN, relating to channel utilization of a link between the UE and the WLAN;
receive a second threshold value, from the network device and via the cellular access network or the WLAN, relating to a data rate of a link between the WLAN and a Wide Area Network (WAN), wherein the WAN is an external Internet Protocol (IP) network to the WLAN and the UE;
receive traffic routing rules, from an Access Network Discovery and Selection Function (ANDSF) device, via the cellular access network or the WLAN;
determine a first metric measuring the channel utilization of the link between the UE and the WLAN;
store a value of the determined first metric in a data structure maintained by the UE;
determine a second metric measuring the data rate of the link between the WLAN and the WAN;
store a second value of the determined second metric in the data structure maintained by the UE; and
steer traffic between the cellular access network and the WLAN based on the first threshold value, the second threshold value, the value of the first metric, the value of the second metric, and the traffic routing rules.

2. The UE of claim 1, wherein the processing circuitry is to determine additional metrics based on:
a Received Channel Power Indicator (RCPI);
a Received Signal to Noise Indicator (RSNI);
a Basic Service Set (BSS) average access delay; or
a BSS Access Category (AC) Access Delay.

3. The UE of claim 1, wherein the first and second metrics are received from the WLAN.

4. The UE of claim 1, wherein the processing circuitry is further to:
steer the traffic to the WLAN when:
the first or second traffic steering metrics satisfy first and second thresholds; or refrain from steering the traffic to the WLAN when:
the first or second traffic steering metric satisfy the first and seconds thresholds.

5. The UE of claim 1, wherein the metrics further include:
a third metric relating to load of the link between the WLAN and the WAN.

6. The UE of claim 1, wherein the processing circuitry is further to:
receive inter-system mobility policies (ISMPs) from the ANDSF; and
perform connection and detachment, with the WLAN, based on the first and second metrics applied to the ISMPs.

7. The UE of claim 1, wherein the metrics additionally include a third metric that includes a percentage signal strength determined based on a received signal strength of the WLAN relative to a reference signal strength associated with the WLAN.

8. The UE of claim 7, wherein the metrics additionally include a fourth metric that includes:
a remaining time within the WLAN; or
a speed of the UE.

9. User Equipment (UE) comprising:
a first transceiver to connect to a cellular access network, wherein the cellular access network includes a 3rd Generation Partnership Project (3GPP) access network;
a second transceiver to connect to a non-cellular access network; and
processing circuitry to:
receive traffic routing rules, from an Access Network Discovery and Selection Function (ANDSF) device, via the cellular access network or the non-cellular access network;
receive traffic steering metrics relating to network conditions associated with the non-cellular access network, the traffic steering metrics including:
a first traffic steering metric relating to a channel utilization of a link between the UE and the non-cellular access network, a value of the first traffic steering metric being stored in a data structure maintained by the UE, and
a second traffic steering metric relating to an uplink or downlink data rate of a link between the non-cellular access network and an external network, wherein the external network is an external Internet Protocol (IP) network to the non-cellular access network and the UE, a value of the second traffic steering metric being stored in the data structure maintained by the UE;
determine whether to steer traffic to the non-cellular access network based on the value of the first traffic steering metric and the value of the second traffic steering metric; and
steer traffic to the non-cellular access network based on a result of the determination of whether to steer traffic to the non-cellular access network.

10. The UE of claim 9, wherein the processing circuitry is further to:
steer the traffic to the non-cellular access network when:
the first or second traffic steering metrics satisfy first and second thresholds; or refrain from steering the traffic to the non-cellular access network when:
the first or second traffic steering metric satisfy the first and seconds thresholds.

11. The UE of claim 9, wherein the first and second thresholds are received from the non-cellular access network.

12. The UE of claim 9, wherein the traffic steering metrics additionally include:
a third traffic steering metric relating to a mobility of the UE with respect to network coverage of the non-cellular access network.

13. The UE of claim 9, wherein the non-cellular access network includes a Wi-Fi access network, and wherein the processing circuitry is further to:
receive inter-system routing policies (ISRPs) from the ANDSF; and
perform the routing of traffic to the non-cellular access network based on rules in the ISRPs.

14. The UE of claim 9, wherein the traffic steering metrics further include:
a third traffic steering metric relating to load of a wide area network (WAN) link connecting the non-cellular access network to the external network.

15. The UE of claim 9, wherein the processing circuitry is further to:
receive inter-system mobility policies (ISMPs) from the ANDSF; and
perform connection and detachment, with the non-cellular access network, based on the first and second traffic steering metrics applied to the ISMPs.

16. A mobile device comprising:
one or more radio transceivers to connect to a plurality of access networks, at least one of the plurality of access networks including a wireless local area network (WLAN) access network;
a non-transitory memory device storing a plurality of processor-executable instructions; and
a processor configured to execute the processor-executable instructions, wherein executing the processor-executable instructions causes the processor to:
process traffic routing rules, received from an Access Network Discovery and Selection Function (ANDSF) device;
determine metrics relating to network conditions associated with the plurality of access network, the metrics including:
a first metric relating to channel utilization of a link connecting the mobile device to the WLAN, a value of the first traffic metric being stored in a data structure maintained by the UE, and
a second metric relating to an uplink or downlink data rate of a link connecting the WLAN to a wide area network (WAN), wherein the WAN is an external Internet Protocol (IP) network to the WLAN and the UE, a value of the second metric being stored in the data structure maintained by the UE; and
steer network traffic over the plurality of access networks based on the first and second metrics, and based on the traffic routing rules received from the ANDSF.

17. The mobile device of claim 16, wherein steering the network traffic over the plurality of access networks includes switching packet flows, for an application, between different ones of the plurality of access networks, in a manner that is transparent to applications executing at end points of the packet flows.

18. The mobile device of claim 16, wherein the metrics additionally include a third metric that includes a percentage signal strength determined based on a received signal strength of one of the plurality of access network relative to a reference signal strength associated with the one of the plurality of access networks.

19. The mobile device of claim 16, wherein the metrics additionally include a fourth metric that includes:
a remaining time within one of the plurality of access networks; or
a speed of the mobile device.

20. The mobile device of claim 16, wherein the routing rules are received via a cellular access network.

* * * * *